United States Patent [19]

MacGregor et al.

[11] Patent Number: 4,649,477

[45] Date of Patent: Mar. 10, 1987

[54] OPERAND SIZE MECHANISM FOR CONTROL SIMPLIFICATION

[75] Inventors: Douglas B. MacGregor, Sakyo, Japan; William C. Moyer, Austin, Tex.

[73] Assignee: Motorola, Inc., Schaumburg, Ill.

[21] Appl. No.: 749,367

[22] Filed: Jun. 27, 1985

[51] Int. Cl.[4] ............................................. G06F 9/34
[52] U.S. Cl. .................................................. 364/200
[58] Field of Search ........................ 364/200 MS File

[56] References Cited

U.S. PATENT DOCUMENTS 4,566,063 1/1986 Zolnowsky et al. ................ 364/200

Primary Examiner—Raulfe B. Zache

Attorney, Agent, or Firm—John A. Fisher; Jeffrey Van Myers; David L. Mossman

[57] ABSTRACT

A data processor having size selector in a controller for explicitly selecting the size of an operand independent of an instruction in an instruction register, together with means for selectively enabling the instruction register or other functional block, or a size selector to select the size of the operand. A size bus and a size multiplexer are also provided to route the size instructions. By using this size mechanism, the amount of sequencing and control logic is significantly reduced from prior data processors. The mechanism allows operations of different sizes to be performed during a single instruction while allowing instruction dependent sizing to be done residually.

8 Claims, 2 Drawing Figures

OPERAND SIZE MECHANISM FOR CONTROL SIMPLIFICATION

FIELD OF THE INVENTION

The present invention relates to a data processing unit of a microprogram control system which deals with variable length data.

BACKGROUND OF THE INVENTION

Instruction execution in typical data processors is partitioned into functional routines. These routines perform either a portion of the instruction or the entire instruction, depending on the instruction's complexity. The major categories of functional routines in current data processors are effective address evaluation and the operation itself. An example is the fetch effective address routine which calculates an effective address and then fetches the sized operand from that address. To perform this operation, it is necessary to provide size information during the address calculation operation to determine the amount to autoincrement and autodecrement the address register for predecrement and postincrement addressing modes. The size is also needed by the bus controller to determine the size of the operand to be fetched from memory. These routines require that the instruction be decoded to reflect the size of the operand to be fetched. Similarly, the instruction operation routine which performs the operation on the operands for the instruction may require their size.

In a machine which performs operations on various sized operands that is controlled by a control structure, it is possible to provide different control sequences for each sized operation. This technique is inefficient, however, for while it is necessary to provide separate control for those operations larger than the size of the available resources, all sizes less than or equal to those resources should share control sequences and allow secondary decoding of the instruction and provide the determination as to which size should occur.

As long as the only sharing of control sequences that takes place concerns the size of the operation there is little difficulty in this approach. However, if there is sharing of code sequences for multiple operations as well as multiple operand sizes, the constraints become more stringent. As an example, there are functional routines provided to evaluate an effective address and to fetch the sized operand. In typical data processors having a 16 bit data bus in current data processors, there are two different routines, one to fetch a long word operand and the other to fetch a byte or a word operand depending upon the size of the operation. These routines can be called in the execution of any instruction.

For example, previous data processors, such as Motorola's M68000 and M68010, perform operations on operands which have their size or length specified as part of the instruction. The size of the operation normally reflects the size of the operand to be operated on for an instruction. There are three operand sizes handled in these processors, namely 8-, 16- and 32-bit operands to perform byte, word and long word operations, respectively. The control used to perform sized operations is derived from the instruction and affects the execution unit, condition codes in the condition code register, the data bus and the bus controller.

When the instruction is decoded, the operations are divided into two categories: long operations and byte/word operations. Because the internal bus, arithmetic units and external data bus are typically 16 bits wide, 16 bits is the maximum natural operand size. It follows that in this scheme, long word operations are performed as two 16 bit operations. The size of the individual operations performed in these previous data processors is always 16 bits for long word operations, and is usually 16 bits in most other cases.

Thus, in general, there are certain resources or parameters which determine the size of the micromachine, regardless of the architecture implemented. By using the initial entry decode to segregate long word operations from other operations, the problem of how to control the execution unit, the data bus and the other size sensitive units is reduced from three types of data sizes to two, i.e. long word and word/byte.

In these previous processors, byte and word operations share control store sequencing. This means that the same microroutines are used to control both byte and word sized operations. Thus, it is necessary for those units which are sensitive to size to be directly provided with this information.

The determination as to whether the size of the operation is byte or word is made by residual decoding of the instruction. The instruction is decoded to determine whether the operation is byte or word. If the instruction size is byte, then a signal is asserted to indicate that this is a byte operation to the size sensitive units. Even though an instruction is sized as byte, not all operations associated with that instruction are byte operations. There may be elements of the byte sized instruction, such as instruction fetch and address calculation which need to be performed as 16 or 32 bit operations. At the start of a byte operation, the microcontroller will enable the residual decoder to provide the decoded size specification to the size sensitive units. For 16- or 32-bit operations, the microcontroller will disable the residual decoder. In this way, a byte operation is specified only if it is decoded as a byte operation in the residual decoder and if the residual decoder is enabled by the nanocontroller. This procedure implies that the only method for specifying a byte operation is to have the instruction decoded as a byte operation in the residual decode.

For a further description of how sizes are specified in these prior art data processors, see U.S. Pat. No. 4,307,445 and U.S. Pat. No. 4,488,228.

SUMMARY OF THE INVENTION

Accordingly, it is an object of the present invention to provide a data processor having the ability to specify the size of an internal operation by a plurality of means.

Another object of the present invention is to provide a data processor which can supply a size encoding to various control units so that operations on various size operands may be performed.

Yet another object is to provide a data processor which can generate the size of an operand either explicitly or implicitly so that the microcontroller may either directly control the size of an operation, or may rely on residual control to specify the size implicitly.

Still another object of the present invention is to provide a data processor in which sizes may be calculated using a selected functional block chosen from a group of available functional block sources, and in which the result can be selected by control means to be used as the designated size for operations.

In carrying out these and other objects of the present invention, there is provided, in one form, a data processor for performing selected operations on an operand having a selected one of a plurality of sizes. The data processor has an instruction register for storing an instruction which selects the operation to be performed on the operand and the size of the operand; an arithmetic and logic unit for performing at least one of the operations on the operand according to the size of the operand; a bus controller for communicating the instruction to the instruction register from a resource external to the data processor, and for communicating the operand having the size between the arithmetic logic unit and the external resource; and a controller, responsive to the instruction stored in the instruction register, for coordinating the bus controller, the instruction register and the arithmetic and logic unit to perform the selected operation on the operand. In accordance with the present invention, the data processor includes size select logic ih the controller for selecting the size of the operand independent of the instruction in the instruction register; and a size controller in the controller for selectively enabling either the instruction register or other functional block, or the size selector to select the size of the operand.

DETAILED DESCRIPTION OF THE INVENTION

Figure 1:
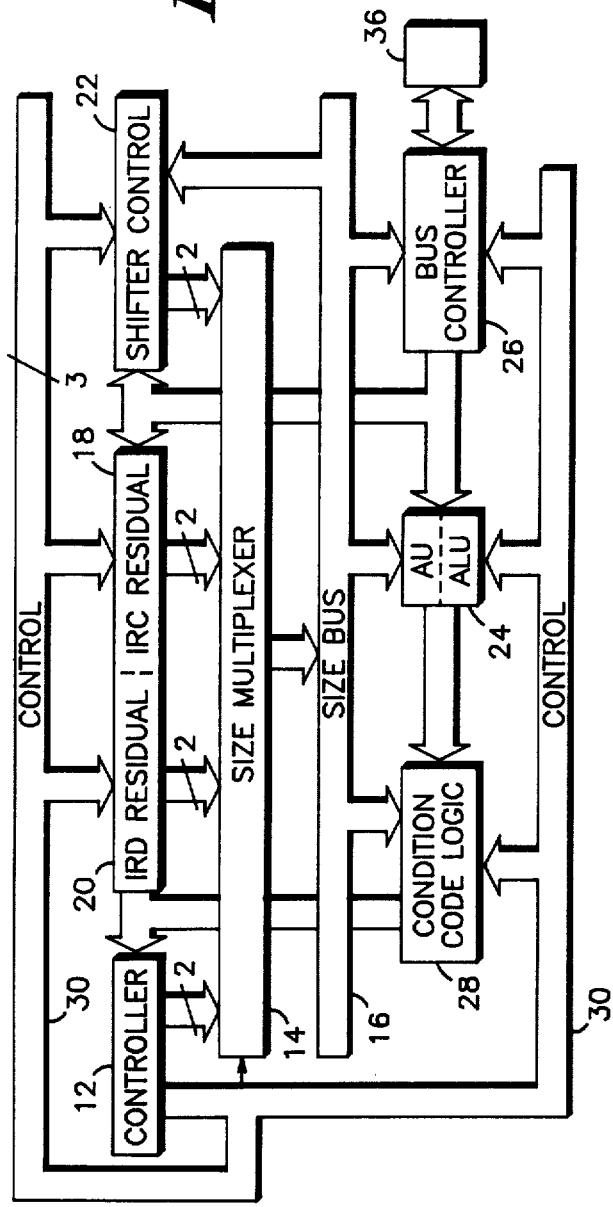
FIG. 1 is a block diagram of a data processor adapted to practice the size control mechanism of the present invention.

In the data processor 10 shown in FIG. 1, the size mechanism of the present invention is implemented in a form which allows both implicit residual size control, where the size is calculated by one of several control units, and explicit size control, where the size is selected or forced by a controller 12. In the form shown in FIG. 1, residual size control information is selectively provided by controller 12, an instruction register C residual (IRC) 18, an instruction register decode residual (IRD) 20 and shifter control 22 to a size multiplexer (mux) 14. IRC 18 and IRD 20 supply the size instruction when told to by controller 12 via control line 30. Also in response to a control signal provided by the controller 12, the size mux 14, via size bus 16, provides the appropriate size information to the several operating units. In the illustrated form, the size information is selectively used by a pair of arithmetic units 24, a bus controller 26 and a condition code logic 28 during operations on operands. Bus controller 26 may read and write information from and to unidentified external resource 36.

Arithmetic and logic unit 24 performs at least one of the operations on the operand dependent on the size of the operand, while bus controller 26 communicates the instruction to the instruction registers, 18 and 20, from external resource 36. Condition control logic unit 28 examines the results of arithmetic and logic operations, computes the need for changes in a condition code register and implements changes in the condition code register.

Figure 2:
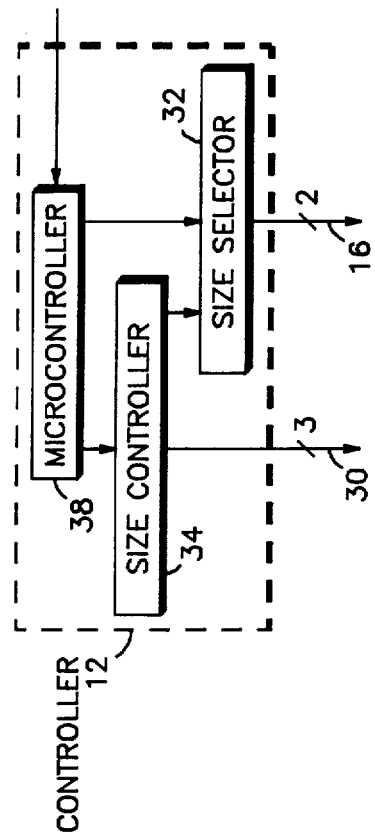
FIG. 2 is a more detailed schematic representation of the controller shown in FIG. 1 revealing the size selector and the size controller.

As can be seen in FIG. 2, the size mechanism consists of a size selector 32 and a size controller 34 in the controller 12. The controller 12 may contain a microcontroller 38 or a nanocontroller within itself to control the function of size selector 32 and size controller 34. Size selector 32 in controller 12 selects the size of an operand independently of the instruction in a particular functional block. Size controller 36 selectively enables either a selected functional block or size selector 32 to select the size of an operand.

If a functional block selects the size of an operand, the size is said to be generated implicitly, and this is roughly how prior data processors operated. If the size selector 32 choses the size of an operand, the size is said to be generated explicitly. There is a third possibility, in which the size is calculated by a functional block, and the result can be used by the controller 12 to specify the size for operations. In any event, the instructions as to how the size is to be generated goes out on control bus 30 and, in the case of explicit size generation, goes directly onto size bus 16 after routing through size multiplexer 14. Size controller 34 may also possess a multiplexer to enable or disable size selector 32.

In prior data processors, the architecture would support byte, word and long word sized operands. By decoding the classes of instructions which operate on the same size operands, i.e. ADD.b (where .b represents byte), OR.b, AND.b, EOR.b, etc., and by providing a residual size decoder, the microcontrol words need not be duplicated for each supported size, i.e. ADD.w, ADD.l, etc., and instruction type, i.e. AND, OR, EOR, etc., where .l represents long words and .w represents word sizes.

In addition, however, the controller in the instant invention has the ability to explicitly control the size of a particular operation when its size is independent of the instruction operand. This new characteristic can also be viewed as forcing the size of the operation. This size is generated by the size selector 32 in controller 12.

By combining the selection of the residual size output with control over its selection, the amount of sequencing, control logic and ROM is significantly reduced because now the same control word is able to be shared among the functional blocks. The size mechanism of this invention allows operations of different sizes to be performed during a single instruction while allowing instruction dependent sizing to be done residually. This permits the functional blocks which are users of size information, such as arithmetic units 24, bus controller 26 and condition code logic unit 28 to operate with more versatility and efficiency. Reliance on only residual decoders is not necessary.

The control over the size information is achieved by use of control line 30. In one embodiment of this invention, control line 30 is three bits wide and is able to transmit the size codes which form part of the microwords or nanowords stored in control 12 and dictated by size controller 34. For example, these size codes may be as follows:

TABLE 1

| Size Codes Permitted on 3 Bit Control Line | | | |
|---|---|---|---|
| Bits: 2 | 1 | 0 | Decode |
| 0 | 0 | 0 | unused |
| 0 | 0 | 1 | IRD size |
| 0 | 1 | 0 | SHIFTER size |
| 0 | 1 | 1 | IRC size |
| 1 | 0 | 0 | long |
| 1 | 0 | 1 | byte |
| 1 | 1 | 0 | word |
| 1 | 1 | 1 | X = don't care |

Thus, bit 2, which may be viewed as size select bit 2, functions as the determinant between explicit and implicit control. If size select bit 2 is low or 0, implicit control is exercised and the appropriate functional block is enabled to provide the size information on the size bus 16 according to the size bus encoding seen in Table 2.

TABLE 2

| Bit | Size Bus Encoding | | Encoding |
|---|---|---|---|
| | 1 | 0 | |
| | 0 | 0 | Long word |
| | 0 | 1 | Byte |
| | 1 | 0 | Word |
| | 1 | 1 | 3 Byte |

On the other hand, if size select bit 2 of the three bit wide control line is high or 1, then explicit control of size selector 32 is enabled and the controller 12 dictates the size of the instruction according to the encoding of Table 1. It should be noted that the size encoding when size select bit 2 is high is identical to the size bus code seen in Table 2. This makes it simple for the size bus 16 to carry the size encodings to the functional blocks, such as ALU 24.

Size multiplexer 14 takes the two bit size code from the selected source, such as controller 12, IRD residual 20 or IRC residual 18 or shifter control 22, and places it on size bus 16 to go to the user functional blocks ALU 24, condition code logic unit 28 or bus controller 26 to go to external source 36.

An example of an instance where controller 12 preferably asserts sizes independently of the instruction under consideration is where one is trying to do a long word move from an addressing mode where a word size index register is used with a byte sized displacement. This invention is ideal for situations where the bus size is desired to be different from the ALU 24 width, for explicit control can be used on the size. That is, explicit control of size may be used in evaluating effective addresses and in the transferring of certain lengths of operands.

We claim:

1. In a data processor for performing selected operations on an operand having a selected one of a plurality of sizes, the data processor comprising
   an instruction register for storing an instruction which selects the operation to be performed on the operand and the size of the operand;
   an arithmetic and logic unit for performing at least one of the operations on the operand according to the size of the operand;
   a bus controller for communicating the instruction to the instruction register from a resource external to the data processor, and for communicating the operand having the size between the arithmetic and logic unit and the external resource;
   a controller, responsive to the instruction stored in the instruction register, for coordinating the bus controller, the instruction register and the arithmetic and logic unit to perform the selected operation on the operand;
   the improvement comprising:
   a size selector in the controller for explicitly selecting the size of the operand independent of the instruction in the instruction register and
   a size controller in the controller for selectively enabling either the instruction register or the size selector to implicitly or explicitly select the size of the operand, respectively.

2. The data processor of claim 1 in which a shifter control is also present for shifting, rotating, inserting or extracting operands during operations, wherein the controller also coordinates the shifter control and wherein size controller in the controller may selectively enable the shifter control to select the size of the operand.

3. The data processor of claim 1 in which a condition code logic unit is also present for examining the results of arithmetic and logic operations, computing the need for changes in a condition code register and implementing changes in the condition code register, wherein the controller also coordinates the condition code logic unit and wherein the arithmetic and logic unit communicates an instruction to the condition code logic unit.

4. In a data processor for performing selected operations on an operand having a selected one of a plurality of sizes, the data processor comprising:
   an instruction register for storing an instruction which selects the operation to be performed on the operand and the size of the operand;
   an arithmetic and logic unit for performing at least one of the operations on the operand according to the size of the operand;
   a bus controller for communicating the instruction to the instruction register from a resource external to the data processor, and for communicating the operand having the size between the arithmetic and logic unit and the external resource;
   a controller, responsive to the instruction stored in the instruction register, for coordinating the bus controller, the instruction register and the arithmetic and logic unit to perform the selected operation on the operand;
   the improvement comprising:
   a size selector in the controller for selecting the size of the operand independent of the instruction in the instruction register and communicating the size of the operand to the arithmetic and logic unit and the bus controller by means of a size multiplexer and a size bus; and
   a size controller in the controller for selectively enabling either the instruction register or the size selector to select the size of the operand.

5. The data processor of claim 4 in which a shifter control is also present for shifting, rotating, inserting or extracting operands during operations, wherein the controller also coordinates the shifter control and wherein size controller in the controller may selectively enable the shifter control to select the size of the operand.

6. The data processor of claim 4 in which a condition code logic unit is also present for examining the results of arithmetic and logic operations, computing the need for changes in a condition code register and implementing changes in the condition code register, wherein the controller also coordinates the condition code logic unit and wherein the arithmetic and logic unit communicates an instruction to the condition code logic unit.

7. In a data processor for performing selected operations on an operand having a selected one of a plurality of sizes including byte, word and long word sizes, the data processor comprising:
   an instruction register for storing an instruction which selects the operation to be performed on the operand and the size of the operand;

an arithmetic and logic unit for performing at least one of the operations on the operand according to the size of the operand;

a bus controller for communicating the instruction to the instruction register from a resource external to the data processor, and for communicating the operand having the size between the arithmetic and logic unit and the external resource;

a controller, responsive to the instruction stored in the instruction register, for coordinating the bus controller, the instruction register and the arithmetic and logic unit to perform the selected operation on the operand;

a shifter control for shifting, rotating, inserting or extracting operands during operations performed by the arithmetic and logic unit;

a condition code logic unit for examining the results of arithmetic operations, computing the need for changes in a condition code register and implementing changes in the condition code register;

the improvement comprising:

a size selector in the controller for explicitly selecting the size of the operand independent of the instruction in the instruction register or the shifter control and communicating the size of the operand to the arithmetic and logic unit, the condition code logic unit and the bus controller by means of a size multiplexer and a size bus and a size controller in the controller for selectively enabling either the instruction register or the shifter control to implicitly select the size of the operand, or enabling the size selector to explicitly select the size of the operand.

8. In a data processor for performing selected operations on an operand having a selected one of a plurality of sizes, the data processor comprising:

an instruction register for storing an instruction which selects the operation to be performed on the operand and the size of the operand;

an arithmetic and logic unit for performing at least one of the operations on the operand according to the size of the operand;

a bus controller for communicating the instruction to the instruction register from a resource external to the data processor, and for communicating the operand having the size between the arithmetic and logic unit and the external resource;

a controller, responsive to the instruction stored in the instruction register, for coordinating the bus controller, the instruction register and the arithmetic and logic unit to perform the selected operation on the operand;

the improvement comprising:

a size selector in the controller for explicitly altering the size of the instruction based on the data only; and a size controller in the controller for selectively enabling either the instruction register or the size selector to implicitly or explicitly select the size of the operand, respectively.

* * * * *